(12) United States Patent
Tipping et al.

(10) Patent No.: US 6,879,944 B1
(45) Date of Patent: Apr. 12, 2005

(54) VARIATIONAL RELEVANCE VECTOR MACHINE

(75) Inventors: Michael Tipping, Girton (GB); Christopher Bishop, Cambridge (GB)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/520,678

(22) Filed: Mar. 7, 2000

(51) Int. Cl.[7] .................. G06F 17/10; G06F 7/60
(52) U.S. Cl. .................. 703/2; 706/12; 706/16; 706/25
(58) Field of Search .................. 703/2; 706/25, 706/12, 16

(56) References Cited

U.S. PATENT DOCUMENTS

| | | | | |
|---|---|---|---|---|
| 5,684,929 A | * | 11/1997 | Cortes et al. | 706/25 |
| 5,692,107 A | * | 11/1997 | Simoudis et al. | 706/12 |
| 5,720,003 A | * | 2/1998 | Chiang et al. | 706/21 |
| 5,855,011 A | * | 12/1998 | Tatsuoka | 705/45 |
| 6,556,960 B1 | * | 4/2003 | Bishop et al. | 703/2 |
| 6,633,857 B1 | * | 10/2003 | Tipping | 706/16 |
| 6,671,661 B1 | * | 12/2003 | Bishop | 703/2 |

OTHER PUBLICATIONS

Matsumoto et al., "Reconstruction and Prediction of Non-linear Dynamical System: A Hierarchical Bayes Approach with Neural Nets", Proceedings of 1999 IEEE International Conference on Acoustics, Speech, and Signal Processing, 1999, vol. 2, pp. 1061–1064.*

Sollich, P., "Probabilistic interpretations and Bayesian methods for support vector machines," Ninth International Conference on Artificial Neural Networks, ICANN 99. Conf. Publ. No. 470, vol.: 1, page(s): 91–96.*

Wahba, G.; Yi Lin; Hao Zhang, "Margin–like quantities and generalized approximate cross validation for support vector machines," Proceedings of the 1999 IEEE Signal Processing Society Workshop Neural Networks for Signal Processing IX, Aug. '99, Pp: 12–20.*

Hearst, M.A.; Dumais, S.T.; Osman, E.; Platt, J.; Scholkopf, B, "Support vector machines," Intelligent Systems, IEEE, vol.: 13 Issue: 4, Jul./Aug. 1998, page(s): 18–28.*

Vladimir N. Vapnik, Statistical Learning Theory, Chapter 10: The Support Vector Method for Estimating Indicator Functions, 1998, John Wiley & Sons, Inc., ISBN 0–471–03003–1.

MacKay, Bayesian non–linear modelling for the prediction competition, in ASHRAE Transactions, vol. 100, pp. 1053–1062, ASHRAE, Atlanta, Georgia, 1994.

MacKay, Bayesian Interpolation, Neural Computation, 4(3): 415–447, 1992.

MacKay, The evidence framework applied to classification networks, Neural Computation, 4(5):720–736, 1992.

(Continued)

*Primary Examiner*—Thai Phan
*Assistant Examiner*—Herng-der Day
(74) *Attorney, Agent, or Firm*—Law Offices of Albert S. Michalik, PLLC

(57) ABSTRACT

A variational Relevance Vector Machine (RVM) is disclosed. The RVM is a probabilistic basis model. Sparsity is achieved through a Bayesian treatment, where a prior is introduced over the weights governed by a set of what are referred to as hyperparameters—one such hyperparameter associated with each weight. An approximation to the joint posterior distribution over weights and hyperparameters is iteratively estimated from the data. The posterior distribution of many of the weights is sharply peaked around zero, in practice. The variational RVM utilizes a variational approach to solve the model, in particular using product approximations to obtain the posterior distribution.

14 Claims, 3 Drawing Sheets

OTHER PUBLICATIONS

Neal, Lecture Notes in Statistics 118, Bayesian Learning for Neural Networks, pp. 15–17, 100–102, 113–116, 147–150 (Springer, 1996).

Platt, Fast training of support vector machines using sequential minimal optimization, in Advances in Kernal Methods: Support Vector Learning, MIT Press, Cambridge, MA (1999).

Jaakkola and Jordan, Bayesian parameter estimation through variational methods, Jan. 21, 1998, to appear in Statistics and Computing.

* cited by examiner

VARIATIONAL RELEVANCE VECTOR MACHINE

FIELD OF THE INVENTION

This invention relates generally to data modeling and analysis, and more particularly to a variational relevance vector machine for such data modeling and analysis.

BACKGROUND OF THE INVENTION

Data modeling has become an important tool in solving complex and large real-world computerizable problems. Applications of data modeling include data compression, density estimation and data visualization. A data modeling technique used for these and other applications is probabilistic modeling. It has proven to be a popular technique for data modeling applications such as speech recognition, vision, handwriting recognition, information retrieval and intelligent interfaces. One framework for developing such applications involves the representation of probability distributions as directed acyclic graphs, which are also known as Bayesian networks, belief networks, and probabilistic independence networks, among other terms.

In probabilistic modeling, usually a training data set is given that includes input vectors $\{x_n\}_{n=1}^N$ along with a set of corresponding targets $\{t_n\}_{n=1}^N$, the latter of which can be real values, in the case of regression analysis, or class labels, in the case of classification analysis. From this training set, a model of $p(t|x)$ is attempted to be inferred, with the object of making accurate predictions of t for new, unlabelled, examples of x. Generally, the principal challenge is to find the appropriate complexity of this model. Scoring alternative models by training set accuracy alone is usually undesirable, since increasing the model complexity, while reducing the training set error, can easily lead to over-fitting and poor generalization. A more robust approach is to introduce a prior distribution over models, which is used in conjunction with the information supplied by the training data to infer the prediction model. This prior distribution, also referred to as a prior, can be explicit, such as in a Bayesian framework, or can be implicit in other approaches.

One method for classification, that has also been extended to regression, is known as the support vector machine (SVM). Although it does not estimate $p(t|x)$, it makes predictions based on a discriminant function of the form $$y(x) = \sum_{n=1}^{N} w_n K(x, x_n) + w_0,$$

where $\{w_n\}$ are the model weights and $K(\cdot,\cdot)$ is a kernel function. A feature of the SVM is that its cost function attempts to minimize the number of errors made on the training set while simultaneously maximizing the margin between the two classes, in the feature space implicitly defined by the kernel. This maximum-margin principle is an appealing prior for classification, and ultimately drives many of the weights to zero, resulting in a sparse kernel classifier where the non-zero weights are associated with $x_n$, that are either on the margin or lie on the wrong side of it. Model complexity is thus constrained such that only these support vectors determine the decision function. In practice, in addition to fitting the model to the training data, it is also necessary to estimate the parameter (usually, denoted C) which regulate the trade-off between the training errors and size of margin, which may entail additional cross-validation.

A disadvantage with the SVM as a general matter is that it utilizes many kernel functions, and may not yield as optimal test performance as may be desired. Furthermore, the SVM utilizes parameters (i.e., those denoted C), which add unwanted complications to the model. To address these concerns, the copending and coassigned patent application entitled "Relevance Vector Machine," filed on Sep. 4, 1999, and assigned Ser. No. 09/391,093, describes a Relevance Vector Machine (RVM) that utilizes a functional form that is equivalent to the SVM, but which is a probabilistic model. It achieves comparable recognition accuracy to the SVM, but advantageously provides a full predictive distribution, and requires substantially fewer kernel functions. As described in this prior application, the RVM relied on the use of type II maximum likelihood, referred to as the evidence framework, to generate point estimates of the hyperparameters that govern model sparsity. However, because analysts desire to have different approaches, techniques and tools to solve a given model, there is a motivation for the present invention. Furthermore, the approach described here provides a closer a approximation to a fully Bayesian treatment than has been possible previously, and this is expected to be advantageous for problems involving data sets of limited size.

SUMMARY OF THE INVENTION

The invention relates to a variational relevance vector machine (RVM). The RVM is a probabilistic basis model of the same functional form of the SVM. Sparsity is achieved through a Bayesian treatment, where a prior is introduced over the weights governed by a set of what are referred to as hyperparameters—one such hyperparameter associated with each weight, whose most probable values are iteratively estimated from the data. The posterior distribution of many of the weights is sharply peaked around zero, in practice. The variational RVM utilizes a variational approach to solve the model, in particular using product approximations to obtain the posterior distribution. In particular, the product approximation used is the distribution of the hyperparameters, times the distribution of the weights, times the distribution of predetermined additional parameters, that differ as to whether a classification-oriented (discrete) model is being provided, or a regression-oriented (continuous) model is being provided. For the latter, the predetermined additional parameters account for noise, while for the former, the predetermined additional parameters account for a lower bound.

In one embodiment, a computer-implemented method includes selecting an initial set of hyperparameters, and iteratively updating the distribution of the set of weights, the distribution of the set of hyperparameters, and the distribution of the set of predetermined additional parameters, until a predetermined convergence criterion has been reach. Thus, the product of these distributions, as they have been iteratively updated until the predetermined convergence criterion has been reached, approximates the posterior distribution for modeling of a data set.

RVM has advantages not found in prior art approaches such as SVM. As compared to SVM, for example, the non-zero weights in the RVM have been seen to not be associated with examples close to the decision boundary, but rather appear to represent more prototypical examples of classes. These examples are termed relevance vectors. Generally, the trained RVM utilizes many fewer basis functions than the corresponding SVM, and often exhibits superior test performance. Furthermore, no additional validation of parameters (such as C) is necessary to specify the model, save those associated with the basis.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
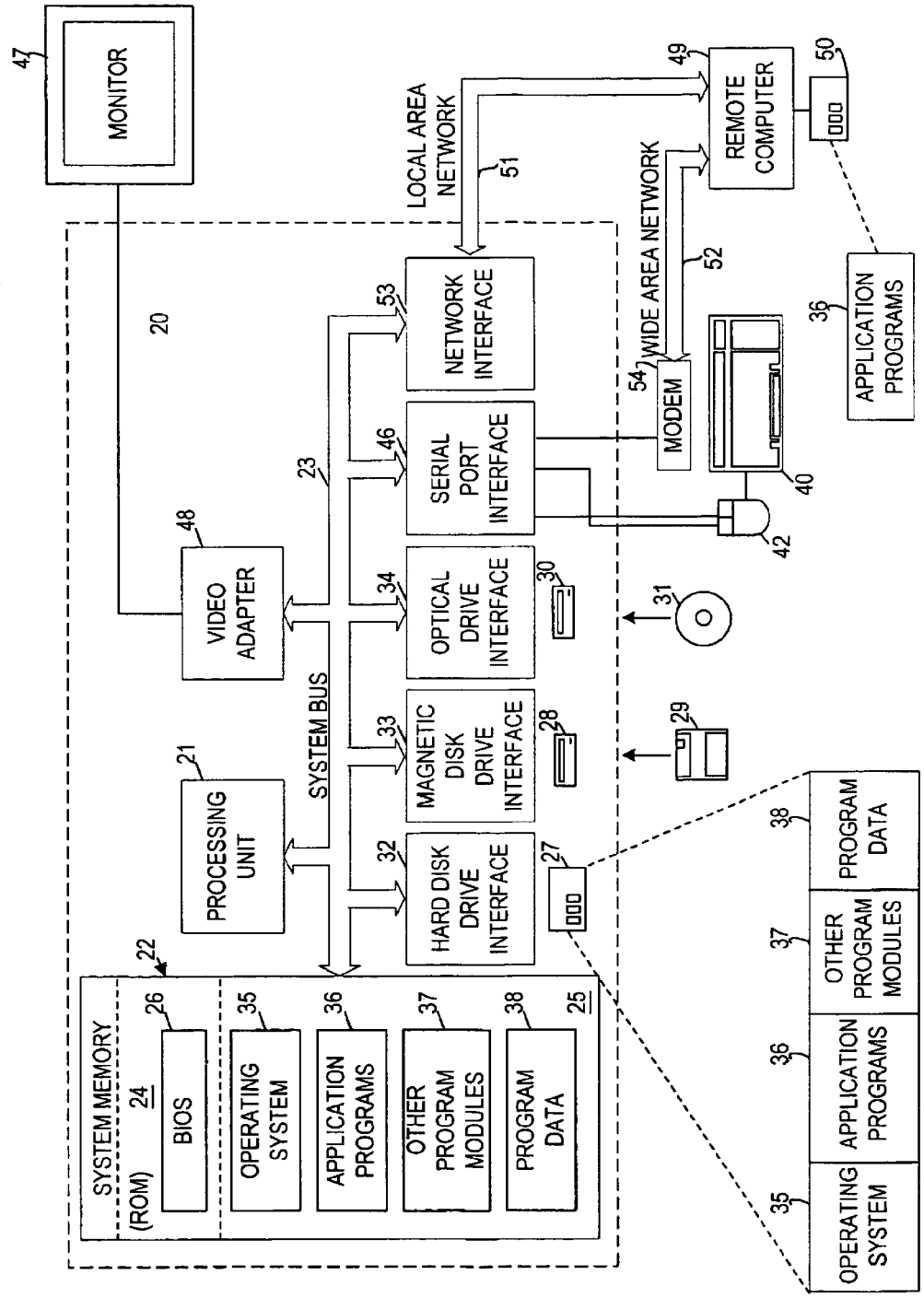
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Generalized Linear Prediction Models

Figure 2:
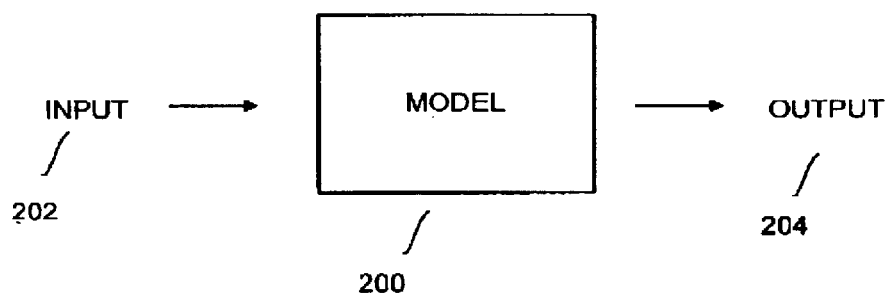
FIG. 2 is a diagram of a predictional model.

In this section of the detailed description, generalized linear prediction models are overviewed, as an introduction to the relevance vector machines described in the succeeding sections of the detailed description. Referring first to FIG. 2, a diagram of a prediction model is shown. The model 200 can be a linear prediction model, which accepts an input 202 and provides an output 204 based on the input 202. Thus, the model 200 must be constructed, which in one embodiment entails generating a prior distribution for the model based on a training set of input and output data input into a learning machine, such as a relevance vector machine (RVM) according to embodiments of the invention as described in succeeding sections of the detailed description.

Figure 3:
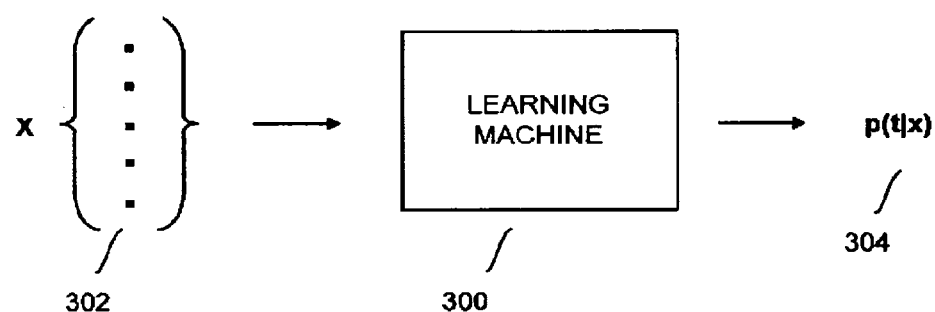
FIG. 3 is a diagram of a learning machine.

Referring next to FIG. 3, a diagram for a learning machine is shown. The learning machine 300 accepts a training set of data x 302, and ultimately outputs a posterior distribution p(t|x) 304, as has been described in the background section. The posterior distribution 304 is determined more specifically based on an output y(x) of the learning machine 300. In a generalized linear prediction model, the output y(x) of a learning machine (i.e., the machine used to obtain a model that can be utilized for predictional purposes) can be written as a link function g{•} applied to a linearly weighted sum, which can be denoted as s(x), of some, usually fixed, basis functions $\phi(x)$, where x is the vector of input variables to the machine. In other words, $$y(x)=g\{s(x)\},$$

where the weighted sum is $$s(x) = \sum_{i=1}^{M} w_i \phi_i(x),$$

and $w_i$ are the weights associated with the M basis functions.

Relevance Vector Machines RVM's) Generally

In this section of the detailed description, an overview of RVM's is presented. This overview is consistent with the treatment of RVM's provided in the copending and coassigned patent application entitled "Relevance Vector Machines," filed on Sep. 4, 1999, and assigned Ser. No. 09/391,093. In subsequent sections of the detailed description, variational RVM's according to varying embodiments of the invention are described.

The RVM makes probabilistic predictions but still retains the predictive performance of the support vector machine (SVM). It preserves the sparseness property of the SVM. For a wide variety of problems, it has been found to actually lead to models that are dramatically sparser than the corresponding SVM, while sacrificing little if any of the accuracy of the prediction.

For regression problems, the RVM models the conditional distribution of the target variable, given an input vector x, as a Gaussian distribution of the form $$P(t|x,w,\tau)=N(t|y(x,w), \tau^{-1})$$

where the notation N(z|m,S) is used to denote a multi-variate Gaussian distribution over z with mean m and covariance S. In the above equation, $\tau$ is the inverse noise parameter, and the conditional mean y(x, w) is given by $$y(x, w) = \sum_{m=0}^{N} w_m \phi_m(x) = w^T \phi.$$

Assuming an independent, identically distribution data set $X=\{x_n\}, T=\{t_n\}$, the likelihood function can be written $$P(T|X, w, \tau) = \prod_{n=1}^{N} P(t_n|x_n, w, \tau)$$

The parameters are given a Gaussian prior of the form $$P(w|\alpha) = \prod_{m=0}^{N} N(w_m|0, \alpha_m^{-1})$$

where $\alpha=\{\alpha_m\}$ is a vector of hyperparameters, with one hyperparameter $\alpha_m$ assigned to each model parameter $w_m$. In the previously filed patent application, values for these hyperparameters are estimated using the framework of type- II maximum likelihood in which the marginal likelihood $P(T|X,\alpha,\tau)$ is maximized with respect to $\alpha$ and $\tau$. Evaluation of this marginal likelihood requires integration over the model parameters $$P(T|X,\alpha,\tau) = \int P(T|X,w;\tau) P(w|\alpha) dw$$

Since this involves the convolution of two exponential-quadratic functions, the integration can be performed analytically, giving $$P(T|X,\alpha\tau) = N(t|0,S)$$

where $t = (t_1, \ldots, t_N)$, and $$S = \tau^{-1}I + \Phi A^{-1}\Phi^T$$

in which I is the N×N unit matrix, $A = \text{diag}(\alpha_m)$, and $\Phi$ is the N×(N+1) design matrix with columns $\phi_m$, so that $(\Phi)_{nm} = \phi(x_n;x_m)$. Maximization of $$P(T|X,\alpha,\tau) = N(t|0,S)$$

with respect to the $\{\alpha_m\}$ can be performed efficiently using an iterative re-estimation process obtained by setting the derivatives of the marginal log likelihood to zero. During the process of this optimization, many of the $\alpha_m$ are driven to large values, so that the corresponding model parameters $w_m$ are effectively pruned out. The corresponding terms can be omitted from the trained model, with the training data vectors $x_n$, associated with the remaining kernel functions being termed relevance vectors. A similar re-estimation process is used to optimize $\tau$ simultaneously with the $\alpha_m$ parameters.

In the classification version of the RVM, the conditional distribution of targets is given by $$P(t|x,w) = \sigma(y)^t [1-\sigma(y)]^{1-t}$$

where $\sigma(y) = (1+\exp(-y))^{-1}$ and $y(x, w)$ is given by $$y(x, w) = \sum_{m=0}^{N} w_m \phi_m(x) = w^T \phi$$

Attention is confined to the case $t \in \{0,1\}$. Assuming independent, identically distributed data, the likelihood function is obtained in the form $$P(T|X, w) = \prod_{n=1}^{N} \sigma(y_n)^{t_n} [1 - \sigma(y_n)]^{1-t_n}$$

As before, the prior over the weights takes the form $$P(w|\alpha) = \prod_{m=0}^{N} N(w_m|0, \alpha_m^{-1})$$

However, the integration required by $$P(T|X,\alpha,\tau) = \int P(T|X,w;\tau) P(w|\alpha) dw$$

in order to evaluate the marginal likelihood can no longer be performed analytically. Therefore, in the previous patent application, a local Gaussian approximation is used to the posterior distribution of the weights. Optimization of the hyperparameters can then be performed using a re-estimation framework, and alternates with re-evaluation of the mode of the posterior, until convergence. Thus, the previous patent application estimates point values for the hyperparameters. As will be described in the next sections of the detailed description, embodiments of the invention utilize variational inference to achieve a more complete Bayesian treatment.

Variational Inference

In this section of the detailed description, an overview of variational inference as can be performed in accordance with embodiments of the invention is given. In a general probabilistic model, the stochastic variables can be partitioned into those corresponding to the observed data, denoted D, and the remaining unobserved variables, denoted $\theta$. The marginal probability of the observed data, which is the model evidence, is obtained by integrating over $\theta$, $$P(D) = \int P(D,\theta) d\theta$$

However, this integration typically is analytically intractable. Variational methods address this difficulty by introducing a distribution $Q(\theta)$, which, for arbitrary choice of Q, allows the marginal log likelihood to be decomposed into terms $$\ln P(D) = L(Q) + KL(Q\|P)$$

where $$L = \int Q(\theta) \ln \frac{P(D, \theta)}{Q(\theta)} d\theta$$

and $KL(Q\|P)$ is the Kullback-Leibler divergence between $Q(\theta)$ and the posterior distribution $P(\theta|D)$, and is given by $$KL(Q\|P) = -\int Q(\theta) \ln \frac{P(\theta|D)}{Q(\theta)} d\theta$$

Since $KL(Q\|P) \geq 0$, then $L(Q)$ is a rigorous lower bound on $\ln P(D)$. Furthermore, since $\ln P(D)$ is independent of Q, maximizing $L(Q)$ is equivalent to minimizing $KL(Q\|P)$, and therefore $Q(\theta)$ represents an approximation to the posterior distribution $P(\theta|D)$.

Therefore, for a suitable choice for the Q distribution, the quantity $L(Q)$ may be tractable to determine, even though the original model evidence function is not. Thus, a variational approach seeks to choose a suitable form for $Q(\theta)$ that is sufficiently simple that the lower bound $L(\theta)$ can be evaluated and yet which is sufficiently flexible that the bound is reasonably tight. Generally, a family of Q distributions is selected, and then the best approximation within this family is sought by maximizing the lower bound with respect to Q. One approach is to assume some specific parameterized functional form for Q and then to optimize L with respect to the parameters of the distribution.

Another approach, as is described more fully in the remainder of the detailed description, is to consider a factorized form over the component variables $\{\theta_i\}$ in $\theta$, so that $$Q(\theta) = \prod_i Q_i(\theta_i)$$

The lower bound is then maximized over all possible factorial distributions by performing a free-form maximization over the $Q_i$, leading to $$Q_i(\theta_i) = \frac{\exp\langle \ln P(D, \theta)\rangle_{k \neq i}}{\int \exp\langle \ln P(D, \theta)\rangle_{k \neq i} d\theta_i}$$

where $\langle \cdot \rangle_{k \neq i}$ denotes an expectation with respect to the distributions $Q_k(\theta_k)$ for all $k \neq i$. If the probabilistic model is expressed as a directed acyclic graph with a node for each of the factors $Q_i(\theta_i)$, then the solution for $Q_i(\theta_i)$ depends only on the Q distributions for variables that are in the Markov blanket of the node i in the graph.

It is noted that the last equation of the previous paragraph represents an implicit solution for the factors $Q_i(\theta_i)$, because the right-hand side depends on moments with respect to the $Q_{k \neq i}$. For conjugate conditional distributions (e.g., linear-Gaussian models with Gamma priors, in the case of continuous variables), this leads to standard distributions for which the required moments can be evaluated. A solution is then determined iteratively by initializing the moments, and cycling through the variables, updating each distribution in turn using $$Q_i(\theta_i) = \frac{\exp\langle \ln P(D, \theta)\rangle_{k \neq i}}{\int \exp\langle \ln P(D, \theta)\rangle_{k \neq i} d\theta_i}.$$

Controlling Model Complexity

In this section of the detailed description, the manner by which varying embodiments of the invention can provide for controlling model complexity is described. The Relevance Vector framework generally provides a manner for solving regression and classification problems in which models are sought that are highly sparse, by selecting a subset from a larger pool of candidate kernel functions, one for each example in the training set. Continuous hyperparameters are used to govern model complexity, thereby avoiding the intractable problem of searching over an exponentially large discrete space of model structures.

One manner to remove superfluous parameters it to use a pruning prior given by a Laplacian of the form $$P(w) = \lambda \exp(-\lambda|w|)$$

However, such a choice of prior does not lead to a tractable variational treatment, since the corresponding variational solution cannot be evaluated analytically.

Therefore, an alternative framework is used, based on a hierarchical prior of the form $$P(w|\alpha) = N(w|0, \alpha^{-1})$$

in which a hyperprior is used given by $$P(\alpha) = \Gamma(\alpha|a,b) \equiv b^a \alpha^{a-1} e^{-b\alpha}/\Gamma(a)$$

where $\Gamma(a)$ is the Gamma function. This distribution has the useful properties $$\langle \alpha \rangle = a/b, \quad \langle \alpha^2 \rangle - \langle \alpha \rangle^2 = a/b^2.$$

The marginal distribution of w is then obtained by integrating over $\alpha$.

The variational framework can be rendered tractable by working not directly with the marginal distribution P(w), but instead leaving hierarchical conjugate form explicit, and introduce a factorial representation given by $Q(w,\alpha) = Q(w)Q(\alpha)$. This is also advantageous because it becomes possible to evaluate the lower bound L as a closed-form analytic expression. This is useful for monitoring the convergence of the iterative optimization, and also for checking the accuracy of an implementation that can be embodied in software, such as one or more computer programs running on a computer as has been described in conjunction with FIG. 1 in a previous section of the detailed description, since updates to the variational distributions cannot lead to a decrease of L. It can also be used to compare models, without resorting to a separate validation set, since it represents an approximation to the model evidence.

Variational Relevance Vector Regression

In this section of the detailed description, relevance vector regression, used in conjunction with continuous data sets, is described, in accordance with one embodiment of the invention, utilizing a variational approach. Thus, the Relevance Vector Machine (RVM) is augmented by the introduction of hyperpriors given by a separate distribution for each hyperparameter $\alpha_m$ of the form $P(\alpha_m) = \Gamma(\alpha_m|a,b)$. Similarly, a prior is introduced over the inverse noise variance $\tau$ given by $P(\tau) = \Gamma(\tau|c,d)$. Broad hyperpriors are obtained by setting $a=b=c=d=10^{-6}$ in one embodiment. Together with the likelihood function $$P(T|X, w, \tau) = \prod_{n=1}^{N} P(t_n|x_n, w, \tau)$$

and the weight prior $$P(w|\alpha) = \prod_{m=0}^{N} N(w_m|0, \alpha_m^{-1})$$

a complete probabilistic specification of the model is achieved.

Next, a factorial approximation is considered to the posterior distribution $P(w,\alpha,\tau|X,T)$ given by $Q(w,\alpha,\tau) = Q_w(w) Q_\alpha(\alpha) Q_\tau(\tau)$. Due to the conjugacy properties of the chosen distributions, the general solution $$Q_i(\theta_i) = \frac{\exp \langle \ln P(D, \theta)\rangle_{k \neq i}}{\int \exp \langle \ln P(D, \theta)\rangle_{k \neq i} d\theta_i}$$

can be evaluated analytically, giving $$Q_w(w) = N(w|\mu_w, \Sigma_w)$$

$$Q_\tau(\tau) = \Gamma(\tau|\tilde{c}, \tilde{d})$$

$$Q_\alpha(\alpha) = \prod_{m=0}^{N} \Gamma(\alpha_m|\tilde{a}_m, \tilde{b}_m)$$

where $$\Sigma_w = \left(diag\langle\alpha_m\rangle + \langle\tau\rangle \sum_{n=1}^{N} \phi_n \phi_n^T\right)^{-1}$$

$$\mu_w = \langle\tau\rangle \Sigma_w \sum_{n=1}^{N} \phi_n t_n$$

$$\tilde{a}_m = a + 1/2 \quad \tilde{b}_m = b + \langle w_m^2\rangle/2$$

-continued $$\tilde{c} = c + (N+1)/2$$

$$\tilde{d} = d + \frac{1}{2}\sum_{n=1}^{N} t_n^2 - \langle w \rangle^T \sum_{n=1}^{N} \phi_n t_n + \frac{1}{2}\sum_{n=1}^{N} \phi_n^T \langle ww^T \rangle \phi_n$$

The requirement moments are evaluated using $$\neq w_{\neq} = \mu_w$$
$$\neq ww^T_{\neq} = \Sigma_w + \mu_w \mu_w^T$$
$$\neq \alpha_{mpullout;zu353100.901} \tilde{a}_m/\tilde{b}_m$$
$$\neq \ln\alpha_{m\neq} = \phi(\tilde{a}_m) - \ln \tilde{b}_m$$
$$\neq \tau_{\neq} = \tilde{c}/\tilde{d}$$
$$\neq \ln\tau_{\neq} = \phi(\tilde{c}) - \ln \tilde{d}$$

where the φ function is defined by $$\varphi(a) = \frac{d}{da}\ln \Gamma(a)$$

The full predictive distribution P(t|x,X,T) is given by $$P(t|x,X,T) = \int\int P(t|x,w,\tau)P(w,\tau|X,T)dw\,d\tau$$

In the variational framework, the true posterior $P(w,\tau|X,T)$ is replaced by the variational approximation $Q_w(w)\cdot Q_\tau(\tau)$. Integration over both w and r is intractable. However, as the number of data points increases, the distribution of $\tau$ becomes tightly concentrated around its mean value. To see this, it is noted that the variance of $\tau$ is given by $\neq \tau^2_{\neq} - \neq \tau_{\neq}^2 = \tilde{c}/\tilde{d} \sim O(1N)$ for large N. Thus, the predictive distribution can be approximated by using $$P(t|x, X, T) = \int P(t|x, w; \neq \tau_{\neq})Q_w(w)dw$$

which is the convolution of two Gaussian distributions. Using $$P(t|x,w,\tau) = N(t|y(x,w), \tau^{-1})$$

and $$Q_w(w) = N(w|\mu_w, \Sigma_w)$$

the following is then obtained $$P(t|x,X,T) = N(t|\mu_w^T\phi(x), \sigma^2)$$

where the input-dependent variance is given by $$\sigma^2(x) = \frac{1}{\langle \tau \rangle} + \phi(x)^T \Sigma_w \phi(x)$$

The lower bound L can also be evaluated, taking the form $$\mathcal{L} = \neq \ln P(T|X,w,\tau)_{\neq} + \neq \ln P(w|\alpha)_{\neq} + \neq \ln P(\alpha)_{\neq} + \neq \ln P(\tau)_{\neq}$$
$$- \neq \ln Q_w(w)_{\neq} - \neq \ln Q_{60}(\alpha)_{\neq}$$
$$- \neq \ln Q_\tau(\tau)_{\neq}$$

in which $$\langle \ln P(T|X, w, \tau) \rangle =$$

$$\frac{N}{2}\langle \ln \tau \rangle - \frac{N}{2}\ln(2\pi) - \frac{1}{2}\langle \tau \rangle \left\{ \sum_{n=1}^{N} t_n^2 - 2\langle w \rangle^T \sum_{n=1}^{N} \phi_n t_n + \sum_{n=1}^{N} \phi_n^T \langle ww^T \rangle \phi_n \right\}$$

-continued $$\langle \ln P(w|\alpha) \rangle = -\frac{N+1}{2}\ln(2\pi) - \frac{1}{2}\sum_{m=0}^{N} \langle \ln \alpha_m \rangle - \frac{1}{2}\sum_{m=0}^{N} \langle \alpha_m \rangle \langle w_m^2 \rangle$$

$$\langle \ln P(\alpha) \rangle = (N+1)a\ln b + (a-1)\sum_{m=0}^{N} \langle \ln \alpha_m \rangle - b\sum_{m=0}^{N} \langle \alpha_m \rangle - (N+1)\ln \Gamma(a)$$

$$\langle \ln P(\tau) \rangle = c\ln d + (c-1)\langle \ln \tau \rangle - d\langle \tau \rangle - \ln \Gamma(c)$$

$$-\langle \ln Q_w \rangle = (N+1)(1 + \ln(2\pi))/2 + \ln|\Sigma_w|/2$$

$$-\langle \ln Q_\alpha \rangle = \sum_{m=0}^{N} \{\tilde{a}_m \ln \tilde{b}_m + (\tilde{a}_m - 1)\langle \ln \alpha_m \rangle - \tilde{b}_m \langle \alpha_m \rangle - \ln \Gamma(\tilde{a}_m)\}$$

$$-\langle \ln Q_t \rangle = \tilde{c}\ln \tilde{d} + (\tilde{c} - 1)\langle \ln \tau \rangle - \tilde{d}\langle \tau \rangle - \ln \Gamma(\tilde{c})$$

Variational Relevance Vector Classification

In this section of the detailed description, relevance vector classification, used in conjunction with discrete data sets, is described, in accordance with one embodiment of the invention, utilizing a variational approach. Classification is somewhat more complex than regression, because a fully conjugate hierarchical structure is not present. Resolution of this difficulty is now described. The log marginal probability of the target data, given the input data, can be written $$\ln P(T|X) = \ln \int\int P(T|X,w)P(w|\alpha)P(\alpha)dw\,d\alpha$$

As before, a factorized variational posterior of the form $Q_w(w)\cdot Q_\alpha(\alpha)$ is introduced, and the following lower bound on the log marginal probability is obtained $$\ln P(T|X) \geq \int\int Q_w(w)Q_\alpha(\alpha)$$

$$\ln\left\{\frac{P(T|X,w)P(w|\alpha)P(\alpha)}{Q_w(w)Q_\alpha(\alpha)}\right\}dw\,d\alpha$$

However, the right-hand side of the above is intractable. Therefore, a further bound is introduced using the inequality $$\sigma(y)^t[1 - \sigma(y)]^{1-t} = \sigma(z) \geq \sigma(\varepsilon)\exp\left(\frac{z-\varepsilon}{2} - \lambda(\varepsilon)(z^2 - \varepsilon^2)\right)$$

where $z=(2t-1)y$ and $\lambda(\xi)=(\tfrac{1}{4}\xi)\tanh(\xi/2)$. Here, $\xi$ is a variational parameter, such that equality is achieved for $\xi=z$. Thus, $$P(T|X, w) \geq F(T, X, w, \varepsilon) = \prod_{n=1}^{N} \sigma(\varepsilon_n)\exp\left(\frac{z_n - \varepsilon_n}{2} - \lambda(\varepsilon_n)(z_n^2 - \varepsilon_n^2)\right)$$

where $z_n=(2t_n-1)w^T\phi_n$. Substituting into $$\ln P(T|X) \geq \int\int Q_w(w)Q_\alpha(\alpha)$$

$$\ln\left\{\frac{P(T|X,w)P(w|\alpha)P(\alpha)}{Q_w(w)Q_\alpha(\alpha)}\right\}dw\,d\alpha,$$

and noting that $P(T|X,w)/F(T,X,w,\xi) \geq 1$ implies $\ln P(T|X,w)/F(T,X,w,\xi) \geq 0$, a lower bound on the original lower bound is obtained, $$\ln P(T|X) \geq L = \int\int dw\,d\alpha\,Q_w(w)Q_\alpha(\alpha)$$

-continued $$\ln\left\{\frac{F(T\mid X,w)P(w\mid\alpha)P(\alpha)}{Q_w(w)Q_\alpha(\alpha)}\right\}$$

The right-hand side of the above equation is now optimized with respect to $Q_w(w)$ and $Q_{60}(\alpha)$, as well as with respect to the parameters $\xi=\{\xi_n\}$. The variational optimization for $Q_w(w)$ yields a normal distribution of the form $$Q_w(w) = N(w\mid m, S)$$

$$S = \left(A + 2\sum_{n=1}^{N}\lambda(\varepsilon_n)\phi_n\phi_n^T\right)^{-1}$$

$$m = \frac{1}{2}S\left(\sum_{n=1}^{N}(2t_n-1)\phi_n\right)$$

where $A=\mathrm{diag}(\alpha_m)$. Similarly, variational optimization of $Q_{60}(\alpha)$ yields a product of Gamma distributions of the form $$Q_\alpha(\alpha) = \prod_{m=0}^{N}\Gamma(\alpha_m\mid \tilde{a}, \tilde{b}_m)$$

$$\tilde{a} = a + \frac{1}{2} \quad \tilde{b}_m = b + \frac{1}{2}\langle w_m^2\rangle$$

Finally, maximizing $$\ln P(T\mid X) \geq L = \int\int dw d\alpha Q_w(w)Q_\alpha(\alpha)$$

$$\ln\left\{\frac{F(T,X,w)P(w\mid\alpha)P(\alpha)}{Q_w(w)Q_\alpha(\alpha)}\right\}$$

with respect to the variational parameters $\xi_n$ gives re-estimation equations of the form $$\xi_n^2 = \Phi_n^{Tpullout; zu353100.900} ww^T_* \Phi_n.$$

The lower bound given by the right-hand side of $$\ln P(T\mid X) \geq L = \int\int dw d\alpha Q_w(w)Q_\alpha(\alpha)$$

$$\ln\left\{\frac{F(T,X,w)P(w\mid\alpha)P(\alpha)}{Q_w(w)Q_\alpha(\alpha)}\right\}$$

can also be evaluated, as $$L = \neq \ln F_* + \neq \ln P(w\mid\alpha)_* + \neq \ln P(\alpha)_* - \neq \ln Q_w(w)_* - \neq Q_\alpha(\alpha)_*$$

where $$\langle \ln F\rangle =$$

$$\sum_{n=1}^{N}\left\{\ln\sigma(\varepsilon_n) + \frac{1}{2}(2t_n-1)\langle w^T\rangle\phi_n - \frac{1}{2}\varepsilon_n - \lambda(\varepsilon_n)(\phi_n^T\langle ww^T\rangle\phi_n - \varepsilon_n^2)\right\}$$

$$\langle \ln P(w\mid\alpha)\rangle = -\frac{1}{2}\sum_{m=0}^{N}\langle\alpha_m\rangle\langle w_m^2\rangle + \frac{1}{2}\sum_{m=0}^{N}\langle\ln\alpha_m\rangle - \frac{(N+1)}{2}\ln(2\pi)$$

$$\langle \ln P(\alpha)\rangle = \sum_{m=0}^{N}\left\{-b\tilde{a}/\tilde{b} + (a-1)(\varphi(\tilde{a}) - \ln\tilde{b}) + a\ln b - \ln\Gamma(a)\right\}$$

-continued $$-\langle\ln Q_w(w)\rangle = \frac{N+1}{2}(1+\ln 2\pi) + \frac{1}{2}\ln|S| - \langle\ln Q_\alpha(\alpha)\rangle$$

$$= \sum_{m=0}^{N}\left\{-(\tilde{a}_m-1)\varphi(\tilde{a}_m) - \ln\tilde{b}_m + \tilde{a}_m + \ln\Gamma(\tilde{a}_m)\right\}$$

Predictions from the trained model for new inputs can be obtained by substituting the posterior mean weights into $$P(t\mid x,w) = \sigma(y)^t[1-\sigma(y)]^{1-t}$$

to give the predictive distribution in the form $$P(t\mid x, \neq w_*).$$

Furthermore, a more accurate estimate can take into account the weight uncertainty by marginalizing over the posterior distribution of the weights. Using the variational result $Q_w(w)$ for the posterior distribution leads to convolution of a sigmoid with a Gaussian, which is intractable. From symmetry, however, such a marginalization does not change the location of the p=0.5 decision surface.

Methods

In this section of the detailed description, methods for implementing a variational relevance vector machine, according to varying embodiments of the invention, are presented. The variational relevance vector machine allows a user to generate a simpler (less complex) model as compared to other techniques, such as a support vector machine, using a variational approach. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. It is noted that the description of the methods in this section implicitly rely on the description of the various variational relevance vector machine techniques as has been described in the preceding sections of the detailed description, as well as other of the preceding sections of the detailed description.

Figure 4:
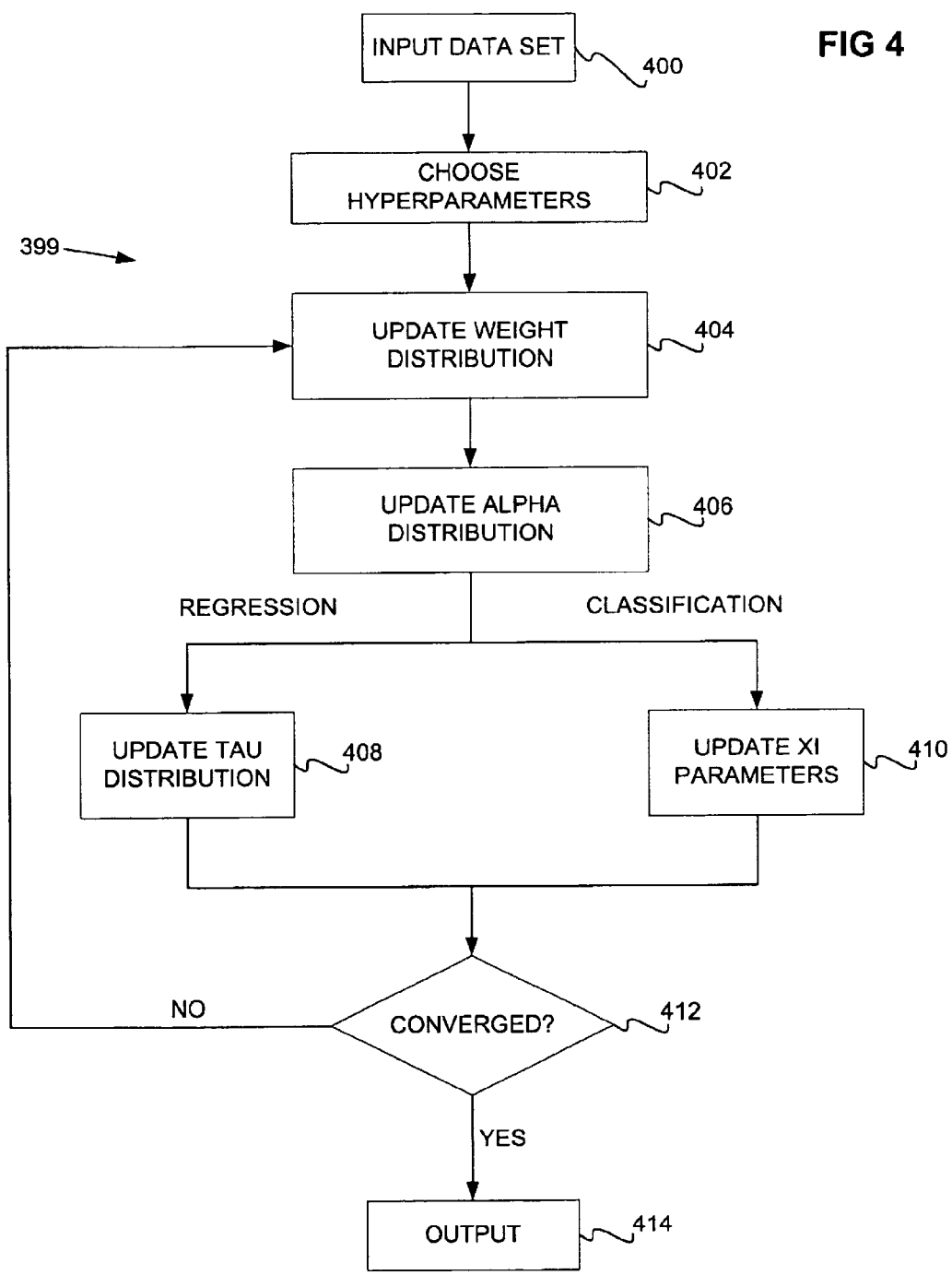
FIG. 4 is a flowchart of methods according to varying embodiments of the invention.

Referring to FIG. 4, a flowchart of a method 399 according to an embodiment of the invention is shown. In 400, a data set to be modeled is input. The data set desirably represents a real-world event or events—for example, the stories read by users of a web site, the television shows watched by viewers, etc. Inputting the data set in one embodiment also includes selecting a model for the data set, such as a generalized linear model as has been described—that is, a form for the ultimate model for the data set can be selected. The invention is not limited to the manner by which input is conducted in 400. For example, the data set may be input by being received from a communications device, from a storage device, etc.

In 402, an initial set of hyperparameters is selected. Ultimately, the set of hyperparameters is used for determining a prior distribution for the data set, for modeling thereof, using a variational approach. The prior distribution is approximated by a product of the distribution of the set of hyperparameters, the distribution of a set of weights, and the distribution of a set of predetermined additional parameters, which in the case of a continuous data set for regression are parameters accounting for noise, and which in the case of a discrete data set for classification are parameters accounting for a (second) lower bound.

Thus, 404, 406, 408 or 410, and 412 represent the iterative cycle of the variational approach for a relevance vector machine. In 404, the distribution for the set of weights is updated, and then in 406, the distribution of the set of hyperparameters (the α parameters) is updated. Next, depending on whether regression or classification is being performed, either the distribution for the parameters taking into account noise (the τ parameters), in the former case, or the distribution for the parameters taking into account the (second) lower bound (the ξ parameters). If the predetermined convergence criterion (as alluded to in the preceding sections of the detailed description) has not been achieved, then the method iterates again, proceeding from 412 back to 404. Otherwise, the method proceeds from 412 to 414.

In 414, at least the posterior distribution, as has been determined, is output. The complete model, including the distribution, may be output as well in one embodiment. The invention is not limited to the manner by which output is accomplished. For example, in one embodiment, output can be to a further analysis program or software component, that allows for analysis and conclusions to be drawn. As another example, output can be displayed on a displayed device, or printed to a printer, etc. As a third example, output can be stored on a storage device, for later further analysis program or software component.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method for modeling a data set comprising:
   selecting an initial set of hyperparameters for determining a prior distribution for the data set for modeling thereof, the prior distribution approximated by a product of a distribution of the set of hyperparameters, a distribution of a set of weights, and a distribution of a set of predetermined additional parameters;
   iteratively updating the distribution of the set of weights, the distribution of the set of hyperparameters, and the distribution of the set of predetermined additional parameters until a predetermined convergence criterion has been reached,
   such that the product of the distribution of the set of hyperparameters, the distribution of the set of weights, and the distribution of the set of predetermined additional parameters as have been iteratively updated approximates the posterior distribution for modeling of the data set for probabilistic prediction; and,
   outputting at least the product approximating the posterior distribution for modeling of the data set.

2. The method of claim 1, further comprising initially inputting the data set to be modeled.

3. The method of claim 1, wherein the data set comprises a continuous data set, such that the set of predetermined additional parameters comprises a set of parameters accounting for noise.

4. The method of claim 1, wherein the data set comprises a discrete data set, such that the set of predetermined additional parameters comprises a set of parameters accounting for a lower bound.

5. A computer-implemented method comprising:
   inputting a data set to be modeled;
   determining a relevance vector learning machine via a variational approach to obtain a posterior distribution for the data set, wherein determining the relevance vector learning machine comprises selecting an initial set of hyperparameters for determining a prior distribution for the data set, the prior distribution approximated by a product of a distribution of the set of hyperparameters, a distribution of a set of weights, and a distribution of a set of predetermined additional parameters, and iteratively updating the distribution of the set of weights, the distribution of the set of hyperparameters, and the distribution of the set of predetermined additional parameters until a predetermined convergence criterion has been reached; and
   outputting at least the posterior distribution for the data set for probabilistic prediction.

6. A computer-implemented method comprising:
   inputting a discrete data set to be modeled;
   determining a relevance vector learning machine via a variational approach to obtain a posterior distribution for the data set, such that a set of predetermined additional parameters comprises a set of parameters accounting for a lower bound; and
   outputting at least the posterior distribution for the data set for probabilistic prediction.

7. A computer-implemented method comprising:
   inputting a continuous data set to be modeled;
   determining a relevance vector learning machine via a variational approach to obtain a posterior distribution for the data set, such that a set of predetermined additional parameters comprises a set of parameters accounting for noise; and
   outputting at least the posterior distribution for the data set for probabilistic prediction.

8. A machine-readable medium having instructions stored thereon for execution by a processor to perform a method for modeling a continuous data set comprising:
   selecting an initial set of hyperparameters for determining a prior distribution for the continuous data set for modeling thereof, the prior distribution approximated by a product of a distribution of the set of hyperparameters, a distribution of a set of weights, and a distribution of a set of parameters accounting for noise;
   iteratively updating the distribution of the set of weights, the distribution of the set of hyperparameters, and the distribution of the set of parameters accounting for noise until a predetermined convergence criterion has been reached,
   such that the product of the distribution of the set of hyperparameters, the distribution of the set of weights, and the distribution of the set of parameters accounting for noise as have been iteratively updated approximates the posterior distribution for modeling of the continuous data set for probabilistic prediction; and,
   outputting at least the product approximating the posterior distribution for modeling of the continuous data set.

9. The medium of claim 8, wherein the method further comprises initially inputting the continuous data set to be modeled.

10. A machine-readable medium having instructions stored thereon for execution by a processor to perform a method for modeling a discrete data set comprising:

selecting an initial set of hyperparameters for determining a prior distribution for the discrete data set for modeling thereof, the prior distribution approximated by a product of a distribution of the set of hyperparameters, a distribution of a set of weights, and a distribution of a set of parameters accounting for a lower bound;

iteratively updating the distribution of the set of weights, the distribution of the set of hyperparameters, and the distribution of the set of parameters accounting for a lower bound until a predetermined convergence criterion has been reached, such that the product of the distribution of the set of hyperparameters, the distribution of the set of weights, and the distribution of the set of parameters accounting for a lower bound as have been iteratively updated approximates the posterior distribution for modeling of the discrete data set for probabilistic prediction; and, outputting at least the product approximating the posterior distribution for modeling of the discrete data set.

11. The medium of claim 10, wherein the method further comprises initially inputting the discrete data set to be modeled.

12. A machine-readable medium having instructions stored thereon for execution by a processor to perform a method comprising:

inputting a data set to be modeled;

determining a relevance vector learning machine via a variational approach to obtain a posterior distribution for the data set for probabilistic prediction, wherein determining the relevance vector learning machine comprises selecting an initial set of hyperparameters for determining prior distribution for the data set, the prior distribution approximated by a product of a distribution of the set of hyperparameters, a distribution of a set of weights, and a distribution of a set of predetermined additional parameters and iteratively updating the distribution of the set of weights, the distribution of the set of hyperparameters, and the distribution of the set of predetermined additional parameters until a predetermined convergence criterion has been reached; and outputting at least the posterior distribution for the data set.

13. A machine-readable medium having instructions stored thereon for execution by a processor to perform a method comprising:

inputting a discrete data set to be modeled;

determining a relevance vector learning machine via a variational approach to obtain a posterior distribution for the data set for probabilistic prediction, such that a set of predetermined additional parameters comprises a set of parameters accounting for a lower bound; and outputting at least the posterior distribution for the data set.

14. A machine-readable medium having instructions stored thereon for execution by a processor to perform a method comprising:

inputting a continuous data set to be modeled;

determining a relevance vector learning machine via a variational approach to obtain a posterior distribution for the data set for probabilistic prediction, such that a set of predetermined additional parameter comprises a set of parameters accounting for noise; and outputting at least the posterior distribution for the data set.

* * * * *